United States Patent Office 3,634,264
Patented Jan. 11, 1972

3,634,264
METHOD AND COMPOSITION FOR CLEANSING HAIR OF ANIMALS
Roy J. Pence, Los Angeles, Calif., assignor to The Regents of the University of California, Berkeley, Calif.
No Drawing. Continuation-in-part of application Ser. No. 181,169, Mar. 20, 1962. This application Nov. 2, 1967, Ser. No. 680,055
Int. Cl. C11d 3/48; A61k 27/00
U.S. Cl. 252—106
6 Claims

ABSTRACT OF THE DISCLOSURE

An aqueous shampoo composition for cleansing the hair of animals and ridding same of blood-sucking ectoparasites for a substantial period of time said composition containing, in solution, imidazole, and preferably a water-immiscible liquid or fat such as pine oil. A method utilizing the above composition which comprises applying said composition to the hair of an animal in the presence of added water in order to produce a good lather. A synergistic composition containing a mixture of imidazole and pine oil.

RELATED APPLICATIONS

This application is a continuation-in-part of my copending application Serial No. 181,169 filed March 20, 1962, now Patent 3,359,158.

BACKGROUND OF THE INVENTION

As a general rule most shampoos which are utilized for washing the hair of animals, e.g., household pets such as dogs, are composed of an aqueous solution containing a detergent. These commercial shampoos generally cleanse the hair thoroughly and remove some of the fleas contained in the hair of the animal by a cleansing action. These shampoos suffer the distinct disadvantage in that the minute the pet is in contact with fleas, the pet is once again infested with fleas. In other words, commercially available shampoos do not have any residual effect in protecting the animal after the shampoo is rinsed off. Moreover, if a dog is heavily infested with fleas the cleansing action does not remove all of the fleas. Since the shampoo itself has no effect on the fleas, the shampoo must be applied again to remove any remaining fleas.

An ideal shampoo for cleansing the hair of animals and ridding the animals of blood-sucking ectoparasites such as fleas, ticks, lice and mites would have the following properties:

(1) It will cleanse the hair thoroughly in one application.
(2) The lather formed during the cleansing operation will rinse off easily but the animal will still be protected from subsequent attacks by blood-sucking ectoparasites.
(3) It will not adversely affect the skin of the animal and will not be toxic to the animal if taken internally.
(4) It will actually kill a substantial portion of the blood-sucking ectoparasites.

SUMMARY OF THE INVENTION

The present invention is based upon the surprising discovery that shampoo compositions having the properties enumerated supra can be produced by dissolving imidazole in a detergent composition containing water and a detergent. The imidazole, even when present in very small amounts, actually kills blood-sucking ectoparasites and, in addition, has a residual effect in that the hair of animals containing imidazole will not be bothered by ectoparasites for a substantial period of time even when the animal is exposed to ectoparasites.

In addition, it has been found that the residual effect of the compositions of this invention is increased by having present in the detergent composition a small percentage of a liquid (e.g., an oil) or fat which is immiscible with water. As a general rule, imidazole is not soluble in a water-immiscible liquid or fat; however, the presence of the detergent in the detergent composition renders the imidazole soluble in the water-immiscible compounds as well as preventng the water-immiscible compounds from separating out or forming a separate phase in the aqueous composition. When the detergent composition, containing a water-immiscible compound, is applied to the hair of the animals and the shampoo is rinsed off, the imidazole and the water-immiscible compound remain on the hair of the animals because said compound, containing the imidazole, is "plated" on the individual hair fibers. This enables the imidazole to have a residual effect for a longer period of time than when imidazole is applied in an aqueous detergent composition containing no oil or fat. In the latter instance, the imidazole usually remains on the hair of the animal, however, since it is not in any solvent, the imidazole is present on the individual fibers as a white crystalline substance which is more easily removed from the fibers than if the imidazole is present in an oil or fat. However, it should be emphasized that whether the imidazole is present in a solution or is present as a white crystalline powder the imidazole will destroy blood-sucking ectoparasites. As a general rule, however, the ectoparasites will avoid the imidazole and therefore will not infest the hair of an animal having imidazole plated thereon.

The present invention is also predicated upon the surprising discovery that a mixture of imidazole and pine oil has a synergistic effect in that the mixture is much more effective than when either component is used alone. Preferably the imidazole is dissolved in the pine oil by utilizing a common solvent or a detergent.

Although any detergent, i.e., any compound having a cleansing action and which forms "lather," can be used in my compositions, it is preferred to use a detergent having a substantial portion of compounds which contain an alkyl group having 12 carbon atoms. Such a detergent appears to add significantly to the effectiveness of the shampoos of this invention.

It is thus an object of the present invention to embody a shampoo which safely and effectively rids the hair of animals of blood-sucking ectoparasites.

Another object of the invention is to disclose and provide a shampoo for cleansing the hair of animals which will protect the animals from blood-sucking ectoparasites for a substantial period of time after the shampoo has been applied to the animal.

It is still a further object of the invention to provide an aqueous composition containing a detergent and having dissolved therein an effective amount of imidazole, said imidazole destroying blood-sucking ectoparasites on contact therewith.

Still another object is to provide a synergistic composition which effectively kills blood-sucking ectoparasites as well as other insects such as cockroaches.

Still another and further object is to provide a novel method for destroying and removing blood-sucking ectoparasites from the hair of animals.

DESCRIPTION OF THE PREFERRED EMBODIMENTS

The foregoing objects are accomplished by the present invention by providing a detergent composition capable of producing a substantial amount of "lather" and having dissolve therein an ectoparasital effective amount of imidazole. Thus, the shampoo compositions of this invention must be composed of an aqueous solution of imidazole together with a detergent.

The term "detergent," as used herein, designates any compound or mixture of compounds that has cleansing action due to lowering of surface tension, dispersing action and foam formation. Thus, the term "detergent," includes a number of surfactants (which have the property of lowering surface tension) but not all because all surfactants do not possess a cleansing action. Any detergent can be utilized in the present invention. For example, anionic detergents, cationic detergents, and nonionic detergents can all be utilized to good effect. Preferably the detergent has a high solubility in water. Nevertheless, even if the detergent is not highly soluble, the solubility can be increased by mixing a minor proportion of alcohol or a glycol ether with the aqueous solvent for the detergent.

As a general rule, anionic detergents are preferred, however, as noted above, both cationics and nonionics can be utilized. As an example of a good nonionic detergent, there may be mentioned the ethylene oxide type of detergent which is formed by treating an alcohol, a phenol or a carboxy acid with ethylene oxide to form a polyethenoxy chain. This type of detergent generally does not have as good foaming properties as the anionics and therefore, from a commercial point of view, is not as desirable as the anionics. Moreover, the polyethenoxy chain does not have quite as good as solubility as an ionogenic group such as $SO_3H$. Nevertheless, nonionic detergents have been utilized to good effect in my invention.

Cationic detergents may also be utilized in the compositions of my invention. Such cationics include those of the Sapamine class which are produced by acylating a symmetrical dialkyl ethylene diamine with a fatty acid chloride (e.g., oleic acid chloride). The quaternary derivatives such as those formed by the addition of sulfate are preferred.

The preferred class of detergents utilized in this invention is the anionic detergents because of their good foaming characteristics and high solubility in aqueous compositions. Broadly speaking, those anionic detergents which are useful in this invention are those in which the solubilizing group is a carboxylic acid, sulfuric esters, alkyl aromatic sulfonic acid or, most preferably, alkane sulfonic acid. In all cases the solubilizing group can either be joined directly to the hydrophobic group or joined to hydrophobic group through an intermediate linkage such as an amide, ester or the like. Any hydrophobic group may be utilized such as straight alkyl chains derived from fatty acids, alkylaryl groups, polymers of lower alkyl compounds, and rosin acids.

A particularly preferred detergent is one which contains a substantial portion of compounds having an alkyl group containing 12 carbon atoms. Examples of such compounds are sodium lauryl ether sulfate, monoethanolamide of lauric acid, monolauryl gylceryl ether, ammonium lauryl sulfate, coconut alcohol sulfates, and dodecyl benzene sulfonates.

In addition to the detergent and the imidazole the compositions of this invention preferably contain a water-immiscible liquid or fat such as Cellosolve, cyclohexanol, tetrahydronaphthalene and lanolin. These water-immiscible liquids are useful in the present invention because they increase the residual effect of the imidazole and thereby increase the length of time between washings of the particular animal to which the compositions of this invention are applied. In other words, the water-immiscible liquids will increase the length of time that fleas or other blood-sucking ectoparasites will not attack the animal after it has been washed. The water-immiscible liquid will go into solution in the water because of the detergent. Of course, if too much water-immiscible liquid is used there will be formed two phases. This is not particularly undesirable insofar as the effectiveness of the composition is concerned but from a consumer's viewpoint it would be undesirable because it would adversely affect the appearance of the product. It is therefore preferred to use only that amount of water-immiscible liquid or fat which will be dissolved in the composition. Because of the presence of the detergent the imidazole is also dissolved in the water-immiscible liquid or fat. This is desirable because when the composition is applied to the animal and thereafter the composition is rinsed off with water the water-immiscible liquid or fat has a tendency to plate on the hair fibers. Since the imidazole is soluble in the water-immiscible liquid or fat the imidazole also remains on the animal to a greater or lesser extent. Since the imidazole actually kills blood-sucking ectoparasites, as well as other insects, the presence of the imidazole on the hair of the particular animal prevents blood-sucking ectoparasites from attacking the animal either by killing them or because the ectoparasites avoid areas where imidazole is present. I have noted that animals which have been washed with an aqueous detergent composition containing both imidazole and a water-immiscible liquid are relatively free of blood-sucking ectoparasites, such as fleas, even though the animal is residing in an environment where fleas and other blood-sucking ectoparasites are present in great numbers.

Preferred water-immiscible compounds are water-immiscible oils and fats which resemble the oils lost by the animal during washing to help replace those oils. Lanolin and pine oil are good examples of such fats and oils.

The preferred water-immiscible liquid or oil of this invention is pine oil. Pine oil is obtained from pine by destructive distillation and consists primarly of terpene alcohol and terpene hydrocarbons. Whenever pine oil is used in the specification or claims it is intended to indicate a composition composed primarily of terpene alcohols and/or terpene hydrocarbons.

Pine oil is an excellent lubricant for the skins of animals; however, it performs even a more useful function in the present compositions. An admixture of pine oil and imidazole possesses a greater effectiveness in killing blood-sucking ectoparasites, as well as other insects, than do the compounds possessed individually. In other words, it is a synergistic mixture.

Pine oil itself has little or no effect on insects, however, when pine oil is added to imidazole the mixture kills insects much more quickly than imidazole itself will do. This synergistic effect will be shown in greater detail infra.

The particular concentrations of the individual constituents of the shampoo compositions of my invention are not critical. The precise amount of detergent in the composition is, of course, dependent upon the particular effectiveness of the detergent being used as well as the desired amount of lather. For economic reasons as little detergent as possible should be used compatible with the requirement of a good lather. Anywhere from 5 to 50% by weight of the composition can be detergent; the preferred range is from 10 to 40% by weight.

The amount of imidazole is also variable; a composition containing as little as .05% by weight is effective. For best results, the composition should contain at least 0.75% by weight, e.g., 0.75% to as high as 4%. Preferably the range is from 0.75% to 2%.

The amount of water-immiscible liquid (oil) or fat present should be sufficient to adequately plate the hair fibers but preferably should not exceed that amount which will go into solution. As noted supra, the effectiveness of the composition is not altered by having more water-immiscible compound than can be dissolved but from an aesthetic standpoint the composition should preferably be one phase. The water-immiscible liquid or fat can be composed anywhere from 1% to 5% by weight of the composition; preferably from 1.5% to 3% by weight.

The following are presently preferred embodiments, all parts being by weight unless otherwise specified.

EXAMPLE I

An aqueous composition having the following constituents is prepared.

| Components: | Amount (pts. wt.) |
|---|---|
| Ammonium lauryl sulfate | 27–29 |
| Thinning agent (free alcohol) | 1–2 |
| NaCl | .5 |
| $Na_2SO_4$ | 0.5 |
| Water | 68–71 |

The sodium chloride and sodium sulfate in the above formulation are impurities. However, since they do not affect the soap composition in an adverse way, it is not worthwhile to remove these impurities in order to form a completely pure composition.

About 0.75 part by weight of imidazole is dissolved in the above composition. Thereafter, 2½ parts by weight of pine oil is added to the composition and thoroughly mixed. A clear solution results in which there are no separate phases.

Twenty dogs were obtained which were heavily infested with fleas, lice and ticks, as well as the usual secondary fungus disorders asociated with excessive scratching. In addition, a number of the dogs had mange which is caused by the mange mite. All of the dogs were wetted with water and the above formulation was applied to the dog in an amount sufficient to work up a good lather. The composition was allowed to remain on the dogs for about 5 minutes and thereafter the lather is rinsed off with water. This rinsing operation takes place in a basin sufficiently large enough to hold the dog. During the rinsing operation a large number of fleas were apparent at the bottom of the basin. A close inspection of the fleas showed that all were dead.

Later inspection of the hair and skin of the dogs indicated no fleas, ticks or lice remained, that previous fungus disorders were nonexistent, and that new hair was found growing in the areas that previously had been bald. After the dogs were inspected they were freed and allowed to roam in areas infested with various blood-sucking ectoparasites. The dogs were inspected ten days after being washed in the above formulation. No blood-sucking ectoparasites were found on the dogs. In addition, those dogs suffering from mange were found to be substantially cured.

EXAMPLE II

The following aqueous detergent composition is prepared.

| Components: | Amounts (pts. wt.) |
|---|---|
| Sodium lauryl ether sulfate | 28–30 |
| Stabilizer (lauryl ether alcohol) | 2 |
| NaCl | 1 |
| $Na_2SO_4$ | 1 |
| Water | 66–68 |

Both the sodium chloride and sodium sulfate in the above formulations are impurities which do not affect the composition adversely and therefore were not removed.

To the above formulation was added 1.5 parts by weight of imidazole and 3 parts by weight of pine oil. Both went into solution, the resulting composition being a clear liquid.

The above solution was applied to about 50 dogs which were selected because they were heavily infested with fleas, lice, ticks; a number of the dogs also had mange, which is caused by the mange mite. The dogs were first wetted and then the above-identified composition was applied in an amount sufficient to form a heavy lather. The composition was allowed to remain on the dogs for about 5 minutes and thereafter was washed off. During the washing off operation all of the fleas, ticks and lice were removed from the dogs. The dogs were then inspected about 10 days after the washing and no ticks, fleas or lice were found on the dogs, and, in addition, those dogs which suffered from mange appeared to be cured.

EXAMPLE III

To 97.75 parts by weight of Palmolive (an aqueous solution containing ethylene oxide and higher alcohols in the $C_{12}$–$C_{15}$ range) was added 0.75 part by weight of imidazole. The resulting composition was clear.

The above formulation was applied to about 30 dogs heavily infested with blood-sucking ectoparasites such as fleas, etc. The dogs were first wetted with water and a sufficient amount of the above formulation was applied to the dog so as to form a heavy lather. The formulation was allowed to remain on the hair of the dogs for about 10 minutes and then was washed off. The dogs were inspected and no blood-sucking ectoparasites were found.

EXAMPLE IV

As noted here before pine oil synergizes the insecticidal affect of imidazole. Preferably both the imidazole and the pine oil are dissolved in a mutual solvent. The synergistic effect is shown below.

TEST I

Formula A—1.5% imidazole and 98.5% acetone.
Formula B—2.5% pine oil and 97.5% acetone.
Formula C—1.5% imidazole, 2.5% pine oil and 96% acetone.

One cc. of each of the above formulas were pipetted into three separate Petri dishes and set aside overnight. Ten German roaches (males) were then placed in each Petri dish. The results of this test are as follows:

NUMBER OF ROACHES KNOCKED DOWN AT TIME DESIGNATED

| Starting time 8:40 [1] | A [2] | B [3] | C [4] |
|---|---|---|---|
| 9:05 | 1 | 0 | 8 |
| 9:10 | 1 | 0 | 1 |
| 9:15 | 2 | 0 | 1 |
| 9:20 | 0 | 0 | |
| 9:25 | 0 | 0 | |
| 9:30 | 1 | 0 | |
| 9:50 | 2 | 0 | |
| 10:05 | 3 | 0 | |

[1] Total time 85 minutes.
[2] 10 K.D. in 85 minutes.
[3] 0 K.D. in 85 minutes.
[4] 10 K.D. in 30 minutes.

The roaches were allowed to remain overnight to determine if there were any recoveries or if any of the roaches exposed to Formula B died. There were no recoveries and none of the roaches exposed to Formula B were knocked down.

TEST II

Three formulations made exactly as in Test I were prepared. One cc. of each formulation was placed in a Petri dish. The dishes were allowed to remain overnight and then ten roaches were placed in each dish. The results of this test are given below:

NUMBER OF ROACHES KNOCKED DOWN AT DESIGNATED TIME

| Starting time 10:30 [1] | A [2] | B [3] | C [4] |
|---|---|---|---|
| 10:40 | 1 | 0 | 1 |
| 10:50 | 2 | 0 | 9 |
| 11:15 | 0 | 0 | |
| 11:30 | 2 | 0 | |
| 12:00 | 1 | 0 | |
| 1:00 | 4 | 0 | |

[1] Total time 2½ hours.
[2] 10 K.D. 2½ hrs.
[3] 0 K.D. 2½ hrs
[4] 10 K.D. 20 minutes.

Results

In this test imidazole plus pine oil was 1 hour and 10 minutes quicker than imidazole alone. Pine oil alone was ineffective.

It will be understood that the foregoing description is only illustrative of the present invention and many other specific embodiments of the present invention will be

I claim:

1. A safe and effective method for destroying and removing blood-sucking ectoparasites from the hair of animals and for protecting the hair from blood-sucking ectoparasites for a substantial period of time which comprises shampooing the hair of animals by applying to said hair a non-toxic aqueous detergent composition consisting essentially of an aqueous solution containing from 0.5% to 4% by weight of imidazole, 1% to 5% of a water-immiscible liquid or fat selected from the group consisting of Cellosolve cyclohexanol, tetrahydronaphthalene, lanolin and pine oil, and from 10% to 50% by weight of a detergent which renders the imidazole soluble in said water-immiscible liquid; whereby the solution of imidazole in the water-immiscible liquid is plated on the hair fibers during shampooing and remains on the hair during rinsing with water-rendering the hair immune from further attacks by blood-sucking ectoparasites for a substantial period of time.

2. A method according to claim 1 wherein the water-immiscible liquid is pine oil, the amount of pine oil being present in an amount of from 1% to 5% by weight.

3. A method according to claim 2 wherein the amount of imidazole is from .75% to 2% by weight.

4. A method according to claim 3 wherein the amount of pine oil is from 1% to 5% by weight.

5. An aqueous shampoo composition consisting essentially of an aqueous solution containing from 0.5% to 4% by weight of imidazole, from 1% to 5% by weight of a water-immiscible liquid or fat selected from the group consisting of Cellosolve cyclohexanol, tetrahydronaphthalene, lanolin and pine oil, and from 10% to 50% by weight of a detergent which renders the imidazole soluble.

6. An aqueous shampoo composition according to claim 5 wherein the water-immiscible liquid is pine oil.

References Cited

UNITED STATES PATENTS

| | | | |
|---|---|---|---|
| 2,023,140 | 12/1935 | Malherbe | 424—196 |
| 2,953,492 | 9/1960 | Duggins | 424—273 |

OTHER REFERENCES

Merck Index, Merck & Co., Rahway, N.J. (1960), p. 955.

Frear, D. E. H., Chemistry of the Pesticides, D. Van Nostrand Co., N.Y. (1955), pp. 415–418.

SAM ROSEN, Primary Examiner

U.S. Cl. X.R.

252—107; 424—196, 273